United States Patent
Claussen et al.

(10) Patent No.: US 9,635,548 B2
(45) Date of Patent: Apr. 25, 2017

(54) FEMTO CELL DEVICES

(75) Inventors: Holger Claussen, Straffan (IE); Irwin Kennedy, Londonderry (GB)

(73) Assignee: Alcatel Lucent, Boulogne-Billancourt (FR)

( * ) Notice: Subject to any disclaimer, the term of this patent is extended or adjusted under 35 U.S.C. 154(b) by 4 days.

(21) Appl. No.: 14/119,614

(22) PCT Filed: May 10, 2012

(86) PCT No.: PCT/EP2012/058596
§ 371 (c)(1),
(2), (4) Date: Nov. 22, 2013

(87) PCT Pub. No.: WO2012/159886
PCT Pub. Date: Nov. 29, 2012

(65) Prior Publication Data
US 2014/0094149 A1  Apr. 3, 2014

(30) Foreign Application Priority Data

May 23, 2011 (EP) .................................... 11290238

(51) Int. Cl.
*H04W 36/00* (2009.01)
*H04W 12/06* (2009.01)
(Continued)

(52) U.S. Cl.
CPC ......... *H04W 12/06* (2013.01); *H04L 63/0876* (2013.01); *H04W 36/04* (2013.01); *H04W 84/045* (2013.01)

(58) Field of Classification Search
CPC ..... H04W 12/02; H04W 12/04; H04W 12/06; H04W 12/08; H04W 12/10;
(Continued)

(56) References Cited

U.S. PATENT DOCUMENTS 5,715,518 A * 2/1998 Barrere ................. H04W 12/06
340/5.8
5,893,031 A * 4/1999 Hoogerwerf ............ H04L 63/08
455/410

(Continued)

FOREIGN PATENT DOCUMENTS

CN 101370306 A 2/2009
CN 101686580 A 3/2010
(Continued)

OTHER PUBLICATIONS

International Search Report for PCT/EP2012/058596 dated Jul. 20, 2012.

*Primary Examiner* — Thai Vu
(74) *Attorney, Agent, or Firm* — Fay Sharpe, LLP

(57) ABSTRACT

A femto cell device comprises: a receiver for receiving transmissions from a user terminal in an active call with a macro cellular network node; an analyzer for determining a radio frequency (RF) signature characterizing the transmissions received from the user terminal; an authorizer arranged to use the RF signature to determine if the user terminal is authorized to use the femto cell device; and a communicator for informing the core network that the femto cell device is a valid candidate handover target for the user terminal when the user terminal is determined by the authorizer to be authorized to use the femto cell device.

17 Claims, 5 Drawing Sheets

(51) Int. Cl.
 *H04W 36/04* (2009.01)
 *H04W 84/04* (2009.01)
 *H04L 29/06* (2006.01)

(58) Field of Classification Search
 CPC  H04W 36/0016; H04W 84/045; H04L 36/04;
                                       H04L 63/0876
 USPC .......... 455/410, 411, 436–444; 370/331–334
 See application file for complete search history.

(56) References Cited

U.S. PATENT DOCUMENTS

| | | | |
|---|---|---|---|
| 7,724,717 B2 | 5/2010 | Porras | |
| 2007/0025265 A1* | 2/2007 | Porras | G06K 7/0008 |
| | | | 370/252 |
| 2007/0291732 A1* | 12/2007 | Todd et al. | 370/351 |
| 2008/0153497 A1* | 6/2008 | Kalhan | 455/436 |
| 2009/0005031 A1 | 1/2009 | Van Lieshout et al. | |
| 2009/0305665 A1* | 12/2009 | Kennedy et al. | 455/410 |
| 2010/0008259 A1* | 1/2010 | Yoon et al. | 370/254 |
| 2012/0083270 A1* | 4/2012 | Robbins et al. | 455/435.1 |
| 2012/0135709 A1* | 5/2012 | Deng et al. | 455/411 |

FOREIGN PATENT DOCUMENTS

| | | |
|---|---|---|
| WO | WO 2009/148485 A2 | 12/2009 |
| WO | WO 2011017944 A1 * | 2/2011 |

* cited by examiner

DSP blocks used to prepare the DCH samples received for feature extraction and ultimately input to the femto classifier Training sequencing and control of the classifier engine

FEMTO CELL DEVICES

FIELD OF THE INVENTION

The present invention relates to femto cell devices.

BACKGROUND

In cellular communications networks, femto cell devices, also termed femto cells or simply femtos, are devices with a small coverage area and are typically deployed in homes, enterprise buildings and public places to further enhance macro-cellular services. Femto cell devices provide coverage underlying a macro cell network, for example. In this specification, the terminology femto cell device, femto cell, femto and femto base station are used interchangeably and refer to the device that provides the coverage.

Femto cell devices offer several advantages. As a femto cell coverage area is relatively small compared to that of a macro cell, data rates to end user devices may be substantially higher than those achieved via an overlying macro cell layer. This may provide improved battery life and end-user service experience. In addition, femto cells off-load end users that otherwise would use macro cells and thus improve the performance and capacity of the macro cells. By employing femto cells, the need for dual-mode handsets to support Wi-Fi and 3G technologies is eliminated because end-users can use the same 3G handset transparently in macro and femto cells.

First generation femto cell device deployment relies on static allocation of spectrum in which a portion of the total spectrum licensed to the operator is to be reserved for femto cells. This form of spectrum usage is mutually exclusive with that allocated to macro cells to ensure that carefully engineered macro cells are not impacted by femto device deployment. However, this approach is undesirable as along term solution. In several territories, especially in some European countries, the available 3G spectrum in which UMTS technologies are currently deployed is very small and is often limited to a single 5 MHz carrier required for UMTS. Thus, making such a reservation of 5 MHz carrier for UMTS femtos is either impossible or not advisable due to loss of macro-cell capacity. As air interface standards evolve to wider bands, such as for example, 20 MHz in WiMAX or for LTE (UMTS Long Term Evolution), static allocation becomes more expensive.

A solution is for femto cell devices to concurrently use the same spectrum that macro-cells use. This approach is termed "concurrent co-channel reuse" but poses significant challenges, some of which have been addressed in the context of UMTS co-channel femto cells. In addition to concurrent co-channel reuse, femto deployments may be arranged to provide exclusive access to a small subset of all subscribers. For example, for a femto deployed in a home, those handsets belonging to family members may exclusively be given permission to use the femto device. In contrast, in normal cellular deployments, typically all subscribers to a network are permitted to use every base station.

One problem with concurrent co-channel reuse is that dense deployments of femto cell devices, for example, thousands of femto cells being deployed per macro-cell, may lead to significant femto-to-macro interference and a consequent reduction in macro-cell capacity and performance. In a realistic simulation study of femto deployment in an east London suburb, it has been found that femto-to-macro interference may be controlled by appropriate power management and that the impact of dense femto deployment on macro-cell performance metrics, such call drops, may be made less significant.

Another problem arising from dense femto deployment is an associated increase in network signaling, for example, handover and location area updates, and data plane traffic, for example during handover. This arises from two design requirements. Firstly, end-user handsets should not require modification and the handsets should not distinguish between femto cell device base stations and macro-cell base stations. Secondly, femto cells should be able to be retrofitted into the legacy macro-cellular architecture by assignment of a location area code and a scrambling code.

As end user handsets are unable to distinguish between femto device base stations and macro base stations, they are also unable to determine which femto cells they are permitted to use and those from which they are excluded. Accordingly, handsets will attempt to make use of the services provided by any femto and many such attempts fail because of the exclusive access restrictions on femtos. Significant amounts of unnecessary signaling and data plane traffic are generated by handsets attempting to use excluded femtos and their subsequent denial of service.

When a user equipment (UE) attached to a macro base station on a macro network requests a handover to a femto cell, the macro network is supplied with the scrambling code of the destination femto cell. This scrambling code is usually not sufficient to uniquely identify the destination femto cell. Thus, all femto cells with that scrambling code attempt to accept the handover request. To enable them to do so, all data plane and signaling plane traffic must be sent to groups of candidate destination femto cells. This results in a large overhead in femto cell backhaul requirements and in femto cell radio resources. Every handover to a femto cell results in each femto cell with the same scrambling code receiving all the data traffic plus all the signaling traffic and each femto cell allocating radio resources in anticipation of handover. Privacy of the UE connection may also be breached, since over the air encryption keys must be shared with all candidate destination femto cells.

Currently, every femto cell base station within the geographical region covered by the macro cell ID reported by the handset attempts to accept the handover. The network forwards all the required physical layer parameters, security credentials, signaling, and data traffic to these femtos. Each femto then attempts to accept the handover. Only one will be successful, however many more have been involved with the brute-force effort.

FIG. 1 illustrates a street 1 lined with houses on both sides. The street 1 is covered by a single macro cell base station 2 with macro cell 3. Several of the houses FM1 to FM7 have a femto cell installed. The downlink radiation of femto cells is likely to leak out of the houses into the street 1. A UE traveling along the street 1 may thus detect a femto and request to handover to it. As a UE in an active call with the macro cell bases station 2 moves along the street, there is a possibility that it will attempt to handover hack kind forth (ping-pong) between the macro-cell base station 2 and at least some of the femto cells FM1 to FM7. Each handover attempt causes signaling traffic and data plane traffic to be sent to all femto cells in the area covered by the macro cell 3. The backhaul for each femto cell is loaded with potentially unnecessary traffic and the femto cell must reserve radio resources to accept the potential handover. It is possible that the UE is not permitted to access any of the femtos on the street 1, so all handover attempts in this case are a waste of resources because they will ultimately be denied.

BRIEF SUMMARY

According to a first aspect of the invention, a femto cell device comprises: a receiver for receiving transmissions from a user terminal in an active call with a macro cellular network node; an analyzer for determining a radio frequency (RF) signature characterizing the transmissions received from the user terminal; an authorizer arranged to use the RF signature to determine if the user terminal is authorized to use the femto cell device; and a communicator for informing the core network that the femto cell device is a valid candidate handover target for the user terminal when the user terminal is determined by the authorizer to be authorized to use the femto cell device.

Every signal transmitted by the user terminal passes through the same analogue circuitry before being radiated over the air. This circuitry effectively remains constant and imposes a distinguishing characteristic signature or 'fingerprint' on the transmitted signal. By characterizing the small differences in the radio waves produced by the respective transmission apparatus of different user terminals, it is possible to distinguish between different user terminals. The characterization is based on the RF signal waveforms received at the receiver of the device and no modifications are required to the user terminal. The RF signature thus can be used to identify the user terminal and the identification may be used to distinguish if a user terminal is included within a particular group, for example, or to more individually distinguish it.

The user terminal may be a mobile handset or some other apparatus having a radio and capable of using the femto cell.

If the user terminal is determined not to be authorized, the femto cell device may simply not send an acknowledgement message to the macro cellular network node when handover is contemplated or alternatively could send a notification that the user terminal is not authorized to access the femto cell device.

The receiver of the device is arranged to receive the transmissions when the user terminal is in active communication with another entity. Where a mobile handset, say, is in an active call with a macro base station, the device also receives the transmissions intended for the base station even though there is no active call between the mobile handset and the device. Thus the device passively acquires the data needed to identify the user terminal. The device is not required to actively connect with the user terminal in order to be able to determine if it is authorized to use the device using the user terminal RF fingerprint.

A femto cell device in accordance with the invention may enable the number of false handover events, with associated wastage of valuable radio resources, to be reduced. Also, impact on the backhaul requirements for femto cells may be reduced compared to previous arrangements as there can be a significant reduction in signaling traffic and potential overhead.

In a cellular network, handover requires security credentials, uplink scrambling code and the like to be provided to the destination base station. If there are many candidate destinations, due to there being ambiguity in femto identification, the plain text content of the connection can potentially be maliciously retrieved at every cell considered to be a candidate. By identifying authorized user terminals and rejecting femtos as possible candidates when a user terminal is not authorized, the number of candidate cells may be reduced and privacy enhanced.

An embodiment involving user terminal identification by RF signature to assist handover in a network is applicable to those implemented using any of the following technology types; UMTS, WiMAX, WiFi, LTE and CDMA, this being a non-exhaustive list as the invention may be applied to other radio arrangements.

In a second aspect of the invention, a data storage medium stores reference RF signature data for use in a device in accordance with the first aspect of the invention. This may be available to download online for use in a device, for example.

BRIEF DESCRIPTION OF THE DRAWINGS

Some embodiments of the present invention will now be described by way of example only, and with reference to the accompanying drawings, in which.

DETAILED DESCRIPTION

Figure 1:
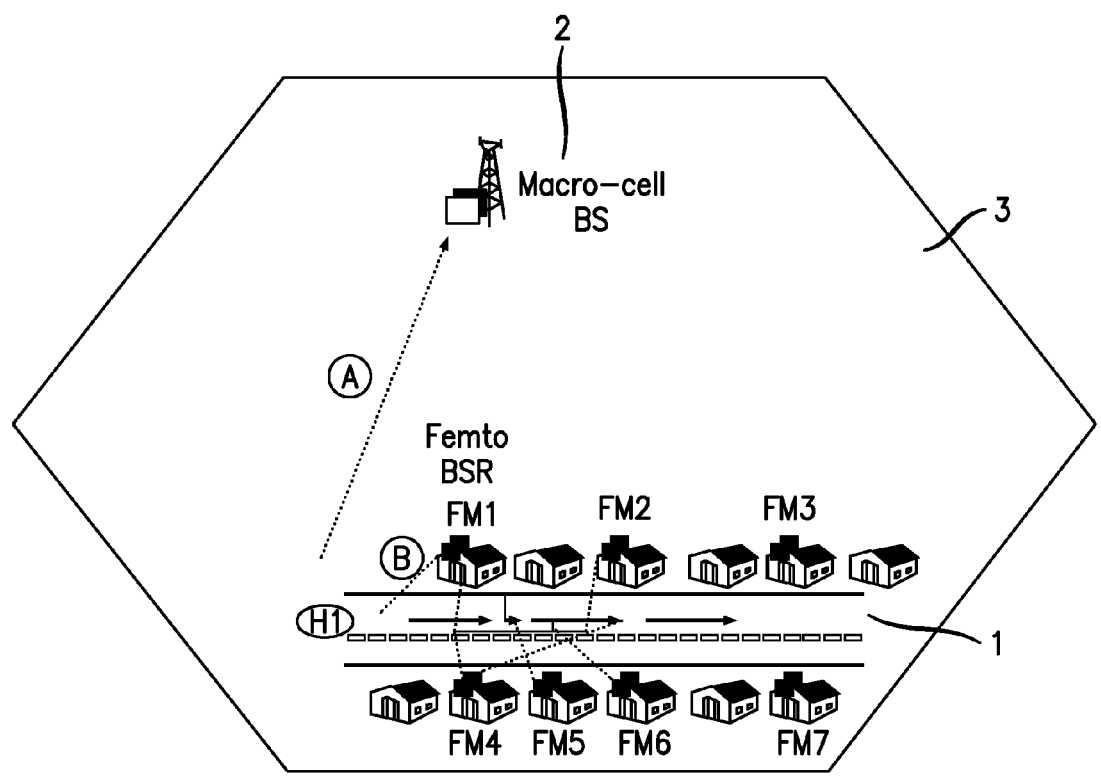
FIG. 1 schematically illustrates a prior scenario.
Figure 2:
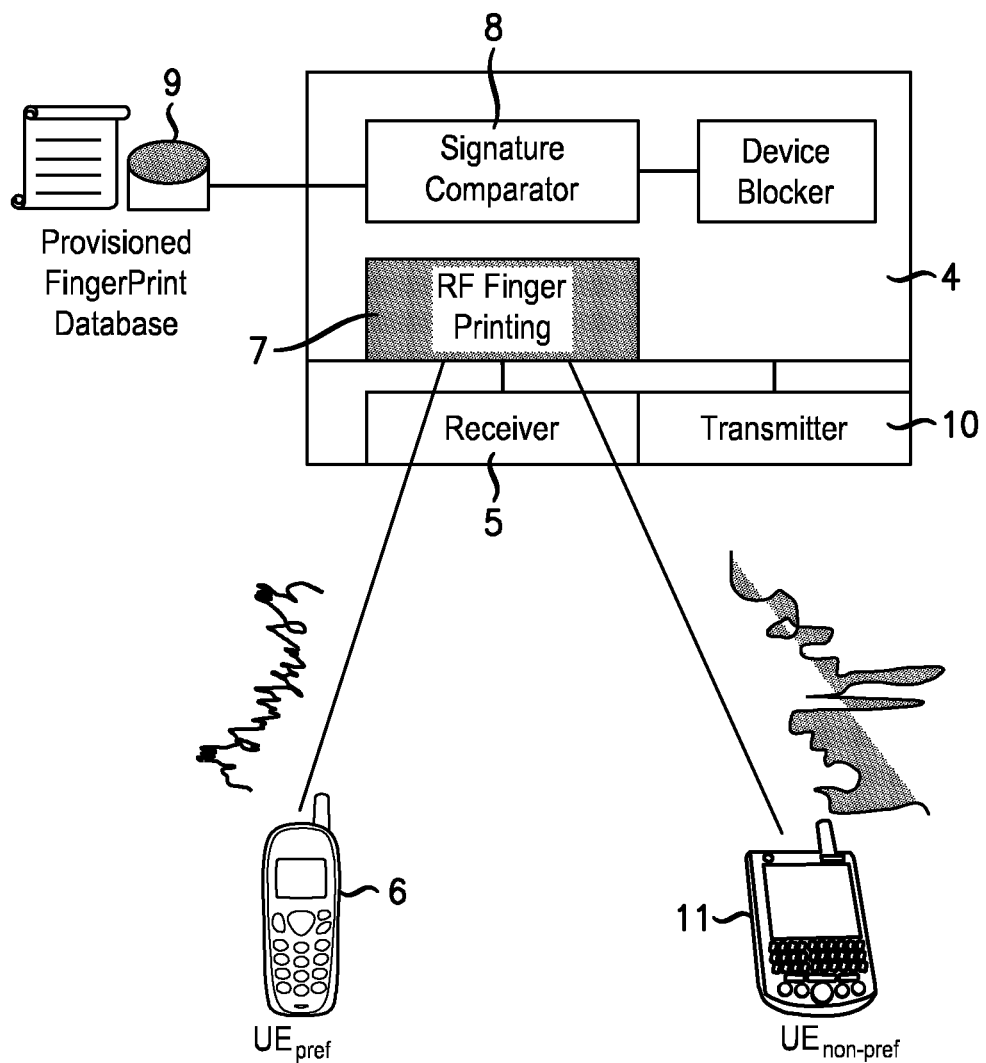
FIG. 2 schematically illustrates a femto cell base station in accordance with the invention.

With reference to FIG. 2, a femto base station 4, also referred to as a femto cell, includes a receiver 5 that detects the transmission of a nearby user terminal (UE) 6 while the UE 6 is in an active call with a macro cellular base station (not shown). An analyzer 7 determines the RF signature imposed on the received UE 6 transmissions. The determined UE RF signature is communicated to an authorizer 8 which includes a comparator for comparing the received RF signature with RF signature data for user terminals held in a store 9. The stored RF signature data is associated with user terminals that are permitted to use the femto cell 4. If the comparator determines that there is a close enough match between the determined RF signature for the UE 6 and a stored signature, the UE is identified as being authorized to use the femto base station 4. The femto base station 4 sends a message via a transmitter 10 to the macro cell base station to inform it that it is a possible handover candidate.

When transmissions from a second, unauthorized UE 11 are received by the receiver 5, analyzed at 7 and undergo authentication at 8, the unauthorized UE 11 is identified as not being authorized to use the femto base station 4. The femto base station 4 may be set up so as to communicate this information to the macro cell base station via transmitter 10. In an alternative arrangement, the femto base station 4 does not message the macro base station with the information regarding the unauthorized second UE 11. If it then receives a request from the macro base station to prepare resources to receive the UE 11 in a handover procedure, it refuses to accept handover, for example, by not acknowledging the handover request, which requires no additional messaging, or in another approach, by sending an explicit refusal message.

The store 9 of RF signature data may be located within the femto base station 4 itself or be connected thereto.

Figure 3:
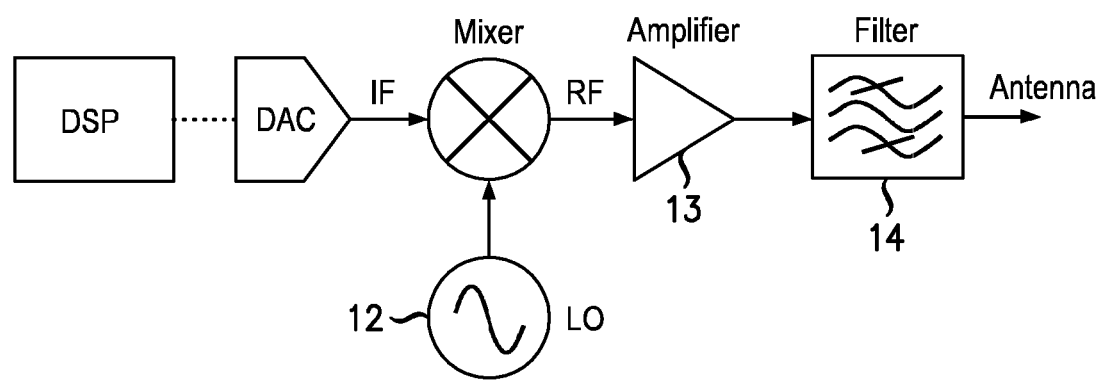
FIG. 3 schematically illustrates a transmit chain of a user terminal.

Every signal transmitted by the authorized UE 6, which is a mobile handset, passes through the same analogue circuitry, schematically shown in FIG. 3, before being radiated over the air to a receiving base station. This is a simplified Figure: there may be other components not shown and there maybe more than one of the components which are shown.

Since the transmit chain circuitry stays constant, it imbues a constant distinguishing characteristic onto the signal. A non-exhaustive list of some transmitter characteristics that may be detectable at the receiver and used for the purposes of classification includes characteristics influenced by: the local oscillator arrangement 12; the amplifier arrangement 13; the filter arrangement 14; and quality.

The stability of the local oscillator 12 determines the accuracy of the centre frequency of the RF signal. Also, its noise level determines the noise level of the RF signal. This could be used to identify the LO-implementation.

The linearity of an amplifier 13 depends strongly on is implementation. The differences in linearity, output power, third order intercept point, et cetera, contribute to a large extent to signal quality measures like Adjacent Channel Power, Error Vector Magnitude, and therefore it is possible to differentiate between individual amplifiers and cards.

The filter 14 is usually implemented in SAW-technology in mobile handsets. Each filter is slightly different, not only varying by manufacturer, but also from batch to batch. Each implementation of the filter has to fulfill certain boundary limits, but may vary within these limits strongly from implementation to implementation. With a wideband signal like UMTS it is possible to measure the filter curve to a degree, which is sufficient to differentiate between filters, therefore identifying individual cards.

Board manufacturing quality will impact how similar two identically specified boards really are at the RF level. Component pick and place, component tolerances, soldering materials consistency, temperature variations and so on, all influence the RF performance of the final product. If these manufacturing variables wander inside a wide range, they can manifest themselves as significant differences in the RF performance of the circuit. This may happen hour to hour, or week to week, at a production facility. It may also happen between two different manufacturing facilities producing the same board.

During an active dedicated channel (DCH) call, a UE is likely to have a much larger path loss to the macro cell to which it is connected than to a nearby femto cell. Signature classification may be initiated long before handover is attempted by the UEs because the power in the uplink to the macro cell is likely to be greater than the power in the downlink from the femto. The femto in many cases will have heard the UEs transmissions long before the UE detects the presence of the femto. This gives the femto the ability to refine and improve its identification capability by performing time averaging on the signal received from the UE.

In a first classification scenario, a population of possible UEs is first divided into C classes. The task is then to identify into which class a candidate UE falls. The femto base station is pre-programmed to accept or reject the UE based on the resulting class. This is a recognition problem which utilizes a classifier to differentiate between the C classes. The classifier is trained on many different examples of each class.

In a second classification scenario, it is assumed that all (or nearly all) UEs have unique characteristics. The task is then to verify if the candidate UE belongs to a set of acceptable UEs. This is a verification problem, where a model is built for each acceptable UE and stored in the femto base station. Candidate UEs are compared to each stored model and a UE is accepted if it meets a predefined level of confidence and rejected if it does not. The models are trained on many different examples of each acceptable UEs.

UE characteristics can be represented in a feature set extracted either at time of manufacture or during the first call by the UE. This feature set is used to train the models and to recognize or verify the candidate UE.

Figure 4:
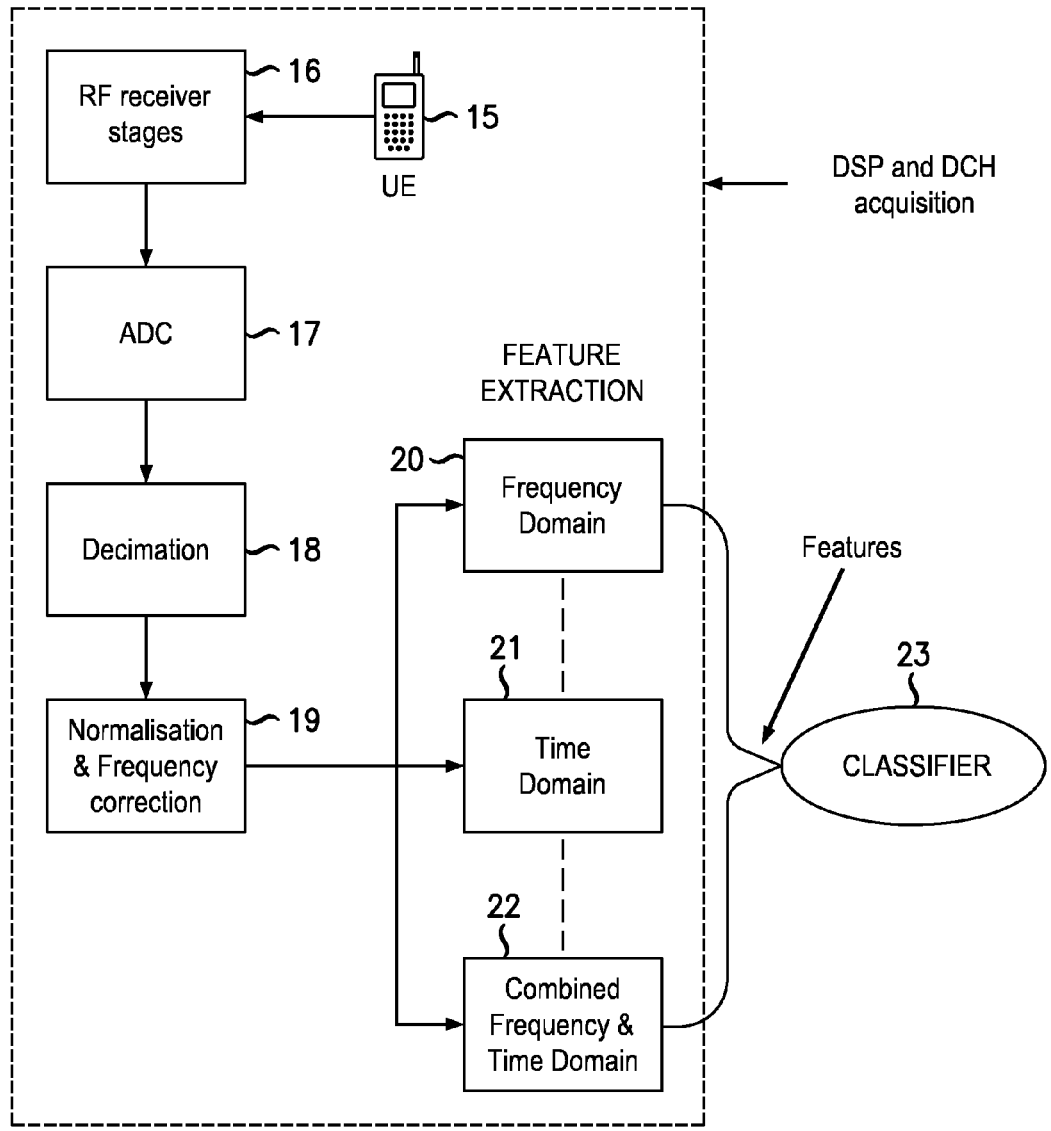
FIG. 4 schematically illustrates feature extraction for providing input to a femto classifier.

With reference to FIG. 4, in digital signal processing (DSP) used for classification, the DCH transmission from a UE 15 is received by a femto RF receive apparatus 16. The received signal is then digitized at ADC 17 and down-sampled and filtered at decimator 18. The amplitude of the time signal is normalized at 19 and any frequency offset between the UE 15 and the femto receive path is corrected. Feature extraction then commences. The outputs of feature extraction engines 20 . . . 21 . . . 22 are fed into a classifier 23 for feature selection and classification engine construction.

There are numerous suitable feature extraction methodologies that can be used, some of which are discussed below.

In a method based on feature extraction in the frequency domain, the signal is received via a wireless channel. It may traverse multiple paths of different lengths therefore multiple copies of the same signal could arrive at the receiver at different times. These multipath signals are superimposed on one another. To deal with this effect, it is necessary to perform a channel estimation procedure and then invert the channel so the signal can be processed as if it had not passed through a multipath channel. There are many ways in which the channel could be estimated. In one approach, the signal is first received as normal, that is, it is demodulated and the symbols estimated. The symbol values are then translated back into a baseband waveform ready for digital to analogue conversion, for example, in UMTS modulation may be performed on I/Q parts and the waveform root raised cosine filtered. This baseband waveform is then used to estimate the channel of the original received waveform with high accuracy.

If there is a large divergence between the expected signal after inversion and the estimated signal, it is assumed that a symbol has been incorrectly estimated. In this case, another subsection of the received signal is then used for analysis.

When the channel estimates are ready, channel inversion is then performed to produce a new signal representative of the originally transmitted signal. This representative signal is used as input to subsequent processing described below.

Spectral analysis may be considered as the process of decomposing something complex into simpler, more basic parts. It is useful to note that some signals are easier to interpret, and take less information to define, in the frequency domain than in the time domain and vice versa. In signal processing, Fourier Analysis is typically thought of as decomposition of a signal into its composite frequency (cosine and sine, real and imaginary) components. Such analysis can be used to isolate individual components of a complex signal, concentrating them for easier detection and/or removal.

The Fourier Transform works on an infinite length continuous signal to produce a continuous spectrum, where the spectrum is the set of sine and cosine magnitudes at different frequencies. Since computers cannot work with continuous or infinitely long signals, an approximation to the Fourier transform known as the Discrete Fourier Transform (DFT) is used instead. The DFT works on a finite length sampled signal and produces a Fourier spectrum with values at a finite number of discrete frequencies. The DFT is widely employed in signal processing and related fields to analyze the frequencies contained in a sampled signal. To correctly resolve a band passed signal at some frequency, it must be sampled at more than twice the highest frequency component. In one example, the RF signal is down converted and acquired at a sampling rate of 12.5 samples/second, which results in the DFT components spanning the spectrum from 0-6.25 MHz.

This finite sampling of the signal may result in a truncated waveform with discontinuities that has different spectral characteristics from the original continuous-time signal. A window function is a function that is zero-valued outside of some chosen interval. Applying smoothing windows improves the spectral characteristics of a sample by minimizing the transition edges of the truncated waveforms. Therefore, the sampled data from each detected signal is first split into windowed overlapping time frames. In this way a finite sequence is extracted for transformation using a FFT algorithm.

The Fourier transform of a random waveform is also random. Therefore, spectral averaging can be used to remove the effects of random noise and transient events and create a clearer picture of the signals underlying frequency content. For example, the time domain samples of each sample signal may be divided into overlapping windowed segments of samples. These segments are frequency transformed and the magnitudes of the resulting frequency are averaged to remove the effect of unwanted noise and reduce random variance. The averaged power spectrum for each sample signal can then used as input to the classifier.

In one embodiment, the classes to be discriminated are the different boards (or UEs) from which the data was acquired. The Nearest Neighbor (NN) classification algorithm is used to determine from which board the data was acquired out of the set of known boards. In the NN algorithm, the training samples are mapped into multidimensional feature space which is partitioned into regions based on the class labels. The class is predicted to be the class of the closest training sample using the Euclidean distance metric. The data used in the classification training and testing steps were different. Once the features are extracted for every sample in the training set, the mean and standard deviation is computed for normalization. Each feature dimension in the training set is separately scaled and shifted to have zero mean and unit variance. These normalization parameters are then applied to the test set.

In one embodiment, a voting algorithm is also implemented to create a more robust classification algorithm. The final decision as to whether a UE is recognized or not is based on the number of sample signals received by a femto. The system takes the output of the classifier for each sample signal and the class having the most votes is the final decision. This provides robustness against noisy or corrupted sample signal data received by the femto.

The classifier is able to distinguish between different classes of UEs. By allocating a UE to one of C classes and the number of UEs allowed to access the femto being less than C, the number of unnecessary attempts to accept a handover may be reduced. If the classifier is not able to classify transmissions of a UE with a given level of confidence, the femto may start the handover accept procedure.

Figure 5:
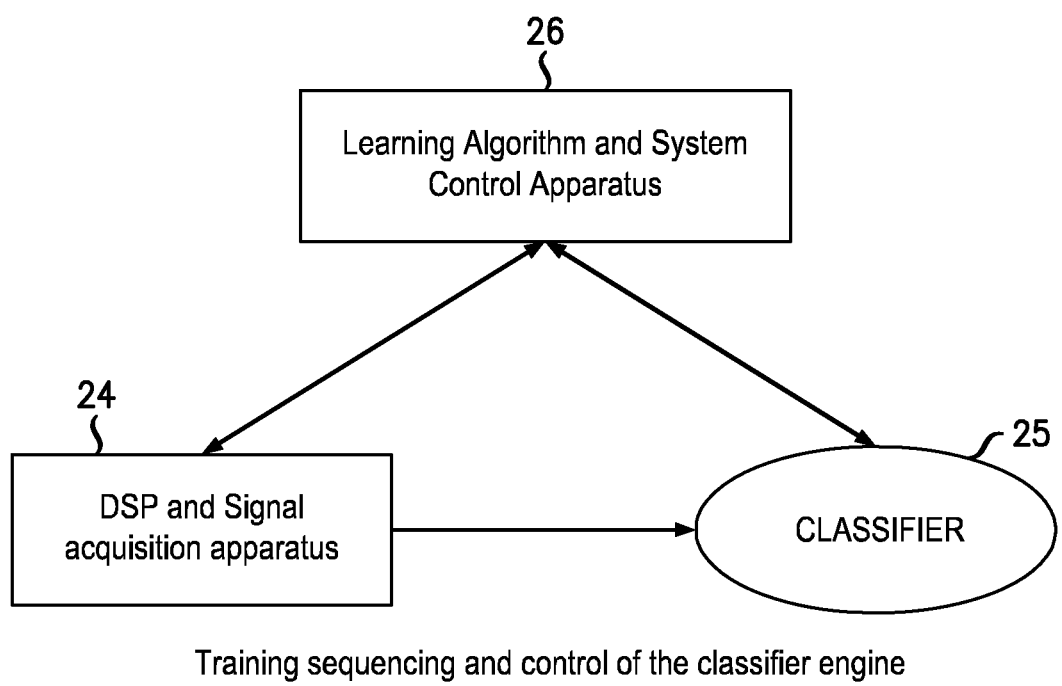
FIG. 5 schematically illustrates training and control of the femto classifier.

As illustrated in FIG. 5, training the femto to recognize its set of UEs involves taking the features produced by the DSP and signal acquisition apparatus 24 and, in conjunction with the classifier engine 25, acquiring features and adjusting the classification model. A control system and learning algorithm 26 may be used to coordinate this activity.

When training the femto to recognize a UE, other UEs may enter the cell or be already present. If the UE is communicating with the femto, it may be desirable to control communication, for example, by halting communication of the other UEs until training is complete. Alternatively, the other UEs could be handed over to another cell occupying another frequency band. The cell on a separate frequency band could be hosted by the femto or another base station. The transfer of other traffic to another frequency band will reduce the noise floor at the femto helping the DSP and training process for the UE undergoing training.

Training involves soliciting the UE under observation to transmit any signals. This is achievable at different times and in several different ways. For example, it may be carried out at the time of manufacture of the user terminal, for example, by creating a general recognition model for a particular model of UE, or creating specific recognition models for individual UEs. These models may be created offline and then downloaded to the femto when required. A model created offline may, however, use a different receiver apparatus for the measurements to the receiver in the actual femto. If a UE is permitted to access several femtos, one training model may be shared between multiple femtos. It may be necessary to adjust the model provided to a femto to take into account the difference between the receiver used to make the UE measurements and the femto that will be used to make the measurements online. For example, the femto receiver may have a different frequency response to the original receiver used to construct the model. The model may need to be adjusted to match the femtos receiver. Alternatively, the femto receiver measurements may be adjusted to match the model.

An alternative involves creating a model at the time the UE registers with the femto. The femto solicits transmissions from the UE being registered and constructs a local recognition model for the UE.

In one method, where there is a dedicated channel (DCH), the femto controls the power level at which the UE is transmitting. The power can be adjusted so that an acceptable SNR is achieved at the femto. If it is a RACH preamble, the RACH preamble power ramping cycle can be fine tuned to provide the most suitable data for training the classifier. One method of fine-tuning is to adjust the parameters contained in information element 10.3.6.54 in 3GPP 25.331. This is contained in the broadcast channels and is read by the UE. It allows the UE transmitter power step to be adjusted and the number of power steps performed to be adjusted when no acknowledgement is received from the femto.

In another approach for isolating the RACH and DCH techniques from other wireless traffic on the femto cell. This enables separate power control to avoid mistaking one UEs transmissions for another UEs transmissions. This is particularly important if soliciting RACH preambles as the training data. The separation is achieved by the UMTS femto radiating a second set of downlink channels using a separate scrambling code. This second set of broadcast channels effectively builds a second cell. The UE under measurement is instructed to handover to this second cell to obtain a more isolated measurement setup. The second cell could be on a different frequency or the same frequency.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A femto cell device comprising a processor including: a receiver for receiving transmissions from a user terminal in an active call with a macro cellular network node; an analyzer for determining a radio frequency (RF) signature characterizing the transmissions received from the user terminal while the user terminal is in the active call with the macro cellular network; an authorizer arranged to use the RF signature to determine if the user terminal is authorized to use the femto cell device; and a communicator for informing the core network that the femto cell device is a valid candidate handover target for the user terminal when the user terminal is determined by the authorizer to be authorized to use the femto cell device;

wherein the analyzer is configured to use the transmissions received from the user terminal in the active call with the macro cellular network node to determine the RF signature based on a distinguishing characteristic imposed by analogue circuitry of the user terminal.

2. The device as claimed in claim 1 wherein the communicator informs the core network that the device is not a candidate handover target when the authorizer determines that the user terminal is not authorized to use the femto cell device.

3. The device as claimed in claim 1 wherein, when the authorizer determines that the user terminal is not authorized to use the femto cell device, the device does not acknowledge a handover request associated with the user terminal.

4. The device as claimed in claim 1 wherein the analyzer performs time averaging on the transmissions received from the user terminal and uses time averaged transmissions in determining the RF signature.

5. The device as claimed in claim 1 wherein the authorizer determines in which class the user terminal is included based on the RF signature and uses the result of the classification to determine if the user terminal is authorized.

6. The device as claimed in claim 5 wherein the authorizer applies a voting algorithm to determine the class in which the user terminal is included.

7. The device as claimed in claim 1 wherein the authorizer uses the RF signature to identify the user terminal and determines if the identified user terminal in included in a set of authorized user terminals.

8. The device as claimed in claim 1 and including a store configured to store reference RF signature data associated with at least one user terminal; and a comparator configured to compare the determined RF signature with stored reference RF signature data.

9. The device as claimed in claim 8 and including an adder configured to allow an end user to add RF signature data associated with at least one user terminal to the store.

10. The device as claimed in claim 1 and including a training processor for providing a signal for receipt at the receiver from a candidate user terminal to be added to a set of user terminals authorized to use the device.

11. The device as claimed in claim 10 wherein the training processor halts communication with other user terminals when providing said signal for receipt from the candidate user terminal.

12. The device as claimed in claim 10 wherein the training processor is arranged to handover other user terminals to another device when providing said signal for receipt from the candidate user terminal.

13. A device as claimed in claim 10 and including an adjustor configured to adjust the transmit power of the candidate user terminal during training.

14. A device as claimed in claim 1 and including an acquirer configured to acquire reference RF signature data from an external source.

15. A device as claimed in claim 14 and including an adjustor configured to adjust acquired data to take into account the receiver response.

16. The device as claimed in claim 1 wherein the user terminal is a mobile handset.

17. A data storage device storing reference RF signature data for use in a device as claimed in claim 1.

* * * * *